(12) United States Patent
Indurkhya et al.

(10) Patent No.: US 10,454,597 B1
(45) Date of Patent: Oct. 22, 2019

(54) SYSTEMS AND METHODS FOR LOCATING TELECOMMUNICATION CELL SITES

(71) Applicant: Virtualitics, Inc., Pasadena, CA (US)

(72) Inventors: Aakash Indurkhya, Pasadena, CA (US); Sarthak Sahu, Pasadena, CA (US); Michael Amori, Pasadena, CA (US); Ciro Donalek, Pasadena, CA (US); Yuankun David Wang, Pasadena, CA (US)

(73) Assignee: Virtualitics, Inc., Pasadena, CA (US)

( * ) Notice: Subject to any disclaimer, the term of this patent is extended or adjusted under 35 U.S.C. 154(b) by 0 days.

(21) Appl. No.: 16/418,927

(22) Filed: May 21, 2019

Related U.S. Application Data (60) Provisional application No. 62/737,785, filed on Sep. 27, 2018.

(51) Int. Cl.
*H04B 17/27* (2015.01)
*H04W 64/00* (2009.01)
(Continued)

(52) U.S. Cl.
CPC ........... *H04B 17/27* (2015.01); *H04B 17/318* (2015.01); *H04B 17/391* (2015.01); *H04W 64/003* (2013.01)

(58) Field of Classification Search
CPC .... H04B 17/27; H04B 17/318; H04B 17/391; H04W 64/003
See application file for complete search history.

(56) References Cited

U.S. PATENT DOCUMENTS

| 6,496,700 B1 * | 12/2002 | Chawla | H04W 16/18 455/435.2 |
| 2002/0005804 A1 | 1/2002 | Suprunov | |

(Continued)

FOREIGN PATENT DOCUMENTS

CA     2348990 C     1/2010

OTHER PUBLICATIONS

Banyai et al., "A New Positioning Concept in GSM Networks", Frame of Mobile Innovation Centre's integrated project Nr. 3.1 supported by the National Office for Research and Technology Hungary (Mobile Jan. 2004 contract), Uploaded Aug. 18, 2015, 5 pgs.

(Continued)

*Primary Examiner* — Dinh Nguyen
(74) *Attorney, Agent, or Firm* — KPPB LLP (57) ABSTRACT

Systems and methods for locating telecommunication cell sites in accordance with embodiments of the invention are illustrated. One embodiment includes a method for locating cell sites, including obtaining a plurality of observations, where each observation includes a timestamp, a coordinate, an active record, and a set of passive records, uniquely identifying secondary cell sites in the passive records by cross-matching active records from a first observation with passive records from a second observation, annotating the observations with unique identifiers for each secondary cell site, time-smoothing the received signal strength values, estimating the distance from each observation to the primary cell site and secondary cell sites associated with the observation by providing a machine learning model with at least the time-smoothed signal strength values and the plurality of annotated observations, and locating the primary cell sites based on the estimated distances.

20 Claims, 4 Drawing Sheets

(51) Int. Cl.
*H04B 17/391* (2015.01)
*H04B 17/318* (2015.01)

(56) References Cited

U.S. PATENT DOCUMENTS

2013/0109393 A1* 5/2013 Shi .................. H04W 36/00835
455/437
2016/0301486 A1* 10/2016 Joey ...................... H04W 48/16
2017/0099583 A1* 4/2017 Wachter ................ H04W 4/029

OTHER PUBLICATIONS

Kune et al., "Location Leaks on the GSM Air Interface", Proceedings of the Network and Distributed System Security Symposium, San Diego, California, Feb. 5-8, 2012, 13 pgs.

Liu et al., "Mobile Localization Based on Received Signal Strength and Pearson's Correlation Coefficient", International Journal of Distributed Sensor Networks, vol. 11, No. 8, Aug. 1, 2015, 10 pgs.

Mark, "How to Find Your Nearest Cell Tower Locations", UberSignal, Apr. 5, 2018, 1 pg.

Nkordeh et al., "Analysis of Mobile Networks Signal Strength for GSM Networks", Proceedings of the World Congress on Engineering and Computer Science, vol. 1, San Francisco, California, Oct. 19-21, 2016, 4 pgs.

Sun et al., "Signal Processing Techniques in Network-Aided Positioning: A survey of state-of-the-art positioning designs", IEEE Signal Processing Magazine, vol. 22, No. 4, Jul. 2005, pp. 12-23.

Warren, Thomas, "How to Find Cell Tower Locations: The Complete Guide", SureCall, Apr. 9, 2019, 1 pg.

Zarimpas et al., "Location Determination and Tracking Using Radio Beacons", Proceedings of the 6th IEE International Conference on 3G and Beyond, Washington, DC, Nov. 7-9, 2005.

* cited by examiner

SYSTEMS AND METHODS FOR LOCATING TELECOMMUNICATION CELL SITES

CROSS-REFERENCE TO RELATED APPLICATIONS

The current application claims priority under 35 U.S.C. 119(e) to U.S. Provisional Patent Application Ser. No. 62/737,785, entitled "Systems and Methods for Locating Telecommunication Transmitters", filed Sep. 27, 2018. The disclosure of U.S. Provisional Patent Application Ser. No. 62/737,785 is incorporated herein by reference in its entirety.

FIELD OF THE INVENTION

The present invention generally relates to the locating of cell sites, and namely systems and methods for locating cell sites which may be visually difficult to find.

BACKGROUND

Broadcast cell sites are devices capable of radiating modulated electromagnetic waves for communication purposes. Cell sites (often called cell towers, base transceiver stations, base stations, mobile phone masts, etc.) are communications installations that use broadcast cell sites to provide network connectivity to cellular-enabled mobile devices. There are numerous standards for defining protocols for cell sites and mobile devices that connect to them such as, but not limited to, GSM, CDMA, and the standards specified by 3GPP.

SUMMARY OF THE INVENTION

Systems and methods for locating telecommunication cell sites in accordance with embodiments of the invention are illustrated. One embodiment includes a method for locating cell sites, including obtaining, from at least one recording device, a plurality of observations, where each observation includes a timestamp indicating the time at which the observation was made, a coordinate indicating the location at which the observation was made, an active record describing a received signal strength of a primary cell site being used for the transmission of telecommunications data, the received primary cell site signal frequency, and a cell ID identifying the cell site, and a set of passive records, where each passive record describes a received signal strength of a secondary cell site, and a signal frequency of the received secondary cell site signal, uniquely identifying secondary cell sites in the passive records by cross-matching active records from a first observation with passive records from a second observation, annotating the observations with unique identifiers for each secondary cell site, time-smoothing the received signal strength values, estimating the distance from each observation to the primary cell site and secondary cell sites associated with the observation by providing a machine learning model with at least the time-smoothed signal strength values and the plurality of annotated observations, and locating the primary cell sites based on the estimated distances.

In another embodiment, the method further includes uniquely identifying secondary cell sites in passive records includes matching the known cell IDs from active records to a signal frequency at which the primary cell site associated with each active record is transmitting, generating geographic bounding boxes for each observation, where each bounding box is associated with the frequency and cell ID for the primary tower for the respective observation, and the bounding box is centered on the coordinate associated with the observation, and assigning cell IDs to cell sites described in passive records based on the signal frequency associated with each cell site in described in the passive record and the coordinate of the observation associated with the passive record.

In a further embodiment, the method further includes discarding ambiguous passive records, where passive records are determined to be ambiguous if the geographic coordinate of the observation associated with the passive record falls within two or more bounding boxes having the same signal frequency as the passive record.

In still another embodiment, the shape of each bounding box is a square.

In a still further embodiment, the shape of each bounding box is based on geographical features near the bounding box.

In yet another embodiment, the machine learning model is a gradient boosted machine.

In a yet further embodiment, each observation further includes an elevation metric indicating the elevation of the recording device at the time indicated by the timestamp.

In another additional embodiment, the machine learning model is further provided with the elevation metric for each observation.

In a further additional embodiment, the cell sites utilize the GSM standard, and each observation further comprises a C1 cell selection parameter and a C2 cell reselection parameter, and the machine learning model is further provided with the C1 cell selection parameters and C2 cell reselection parameters.

In another embodiment again, locating the primary cell sites further includes drawing a ring on a map around each observation with a radius of the predicted distance to the cell site for each cell site associated with each respective observation, applying a convolutional filter to each ring, generating a heat map based on the rings, such that a higher heat value represents a higher degree of overlap of rings at the given coordinate, identifying peak heat values as cell site locations, and tagging the cell site locations with the associated cell ID.

In a further embodiment again, the convolutional filter creates a Gaussian blur.

In still yet another embodiment, the method further includes visualizing the locations of each cell site using a display device.

In a still yet further embodiment, the display device is a virtual reality display device.

In still another additional embodiment, a primary cell site of a first observation is a secondary cell site of a second observation.

In a still further additional embodiment, received signal strengths are expressed as Received Signal Strength Indication metrics (RSSIs).

In still another embodiment again, the method comprises moving the at least one recording device throughout a geographic region of interest In a still further embodiment again, a system for locating cell sites includes at least one recording device including a receiver circuitry, a global positioning system circuitry, and a clock circuitry, where the at least one recording device is configured to create observations of cell site signals, where each observation includes a timestamp, obtained with the clock circuitry, indicating the time at which the observation was made, a coordinate, obtained with the global positioning system circuitry, indicating the location at which the observation was made, an active record describing a received signal strength of a primary cell site signal being used for the transmission of telecommunications data, the received primary cell site signal frequency, and a cell ID identifying the cell site, and a set of passive records, where each passive record describes a received signal strength of a secondary cell site, and a signal frequency of the received secondary cell site signal, where the primary cell site signal and secondary cell site signals are received using the receiver circuitry, and a cell site locator device including a processor, and a memory containing a cell site locator application, where the cell site locator application directs the processor to obtain a plurality of records from the at least one recording device, uniquely identify secondary cell sites in the passive records by cross-matching active records from a first observation with passive records from a second observation, annotate the observations with unique identifiers for each secondary cell site, time-smooth the received signal strength values, estimate the distance from each observation to the primary cell site and secondary cell sites associated with the observation by providing a machine learning model with at least the time-smoothed signal strength values and the plurality of annotated observations, and locate the primary cell sites based on the estimated distances.

In yet another additional embodiment, to uniquely identify secondary cell sites, the cell cite locator application further directs the processor to match the known cell IDs from active records to a signal frequency at which the primary cell site associated with each active record is transmitting, generate geographic bounding boxes for each observation, where each bounding box is associated with the frequency and cell ID for the primary tower for the respective observation, and the bounding box is centered on the coordinate associated with the observation, and assign cell IDs to cell sites described in passive records based on the signal frequency associated with each cell site in described in the passive record and the coordinate of the observation associated with the passive record.

In a yet further additional embodiment, the cell cite locator application further directs the processor to discard ambiguous passive records, where passive records are determined to be ambiguous if the geographic coordinate of the observation associated with the passive record falls within two or more bounding boxes having the same signal frequency as the passive record.

In yet another embodiment again, to locate primary cell sites, the cell cite locator application further directs the processor to draw a ring on a map around each observation with a radius of the predicted distance to the cell site for each cell site associated with each respective observation, apply a convolutional filter to each ring, generate a heat map based on the rings, such that a higher heat value represents a higher degree of overlap of rings at the given coordinate, identify peak heat values as cell site locations, and tag the cell site locations with the associated cell ID.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Mobile devices have increasingly become of key importance in many aspects of public and private enterprises. Many mobile devices are connected to cellular networks to gain access to other connected devices and/or other networks (e.g. the Internet). Cellular networks generally have numerous access points ("cell sites"), which include at least one transmitter and at least one receiver for communicating with mobile devices, and other communications equipment for transferring data to other cell sites or nodes in the network. In many embodiments, cell sites are cell towers. However, cell sites can take many forms, many of which are designed to be obscured or otherwise hidden from public view. Each cell tower can be given a unique identifier, and operate on a particular frequency. Because only a limited spectral band is usable for cellular telecommunications (often further limited by government regulation), some cell sites may utilize the same frequency for transmission.

Cell sites generally have an effective range at which their signals can be received by a mobile device. In many embodiments, the effective range is dictated in part by the technical capabilities of the receiver in the mobile device and/or the power at which the cell site transmits. In numerous embodiments, cell sites are assigned frequencies in a manner that attempts to maximize the distance between cell sites that transmit at the same frequency. However, in locations where there is a high density of mobile devices, many cell sites can be necessary to support concurrent connectivity such that a mobile device may receive transmissions from two different cell sites using the same frequency.

Indeed, in numerous embodiments, a mobile device connected to a cellular network receives multiple signals from different cell sites at the same time. Mobile devices can be connected to a single cell site that is actively used for transmitting and receiving telecommunication data (e.g. phone calls, cellular data, configuration data, and/or any other data generally transmitted and received between a cell phone and the connected cellular network. The data describing the unique identifier for the cell site, a frequency metric describing the frequency at which the cell site is transmitting, and the signal strength of the received signal from the cell site can be stored in what is commonly referred to as an "active record." When the mobile device is within the range of other cell sites that are not actively being used for data transmission, a frequency metric describing the frequency of the received signals from the currently unused cell sites along with the signal strength of the received signals can be stored as what are often referred to as "passive records" or "neighbor records." Active records and passive records can be recorded at the same time and are referred to collectively as an "observation." In a variety of embodiments, each observation is associated with a geographic coordinate, such as, but not limited to, a latitude and longitude provided by a Global Positioning System (GPS) receiver, an altitude, and/or any other positioning metric obtained. Mobile devices can make numerous observations in a given time period. For example, some mobile devices make multiple observations per second, while others take one observation per second. However, any number of time intervals can be used to take observations as appropriate to the requirements of specific applications of various embodiments of the invention. A sample set of records in accordance with an embodiment of the invention are illustrated in Table 1 (appended).

Conventional cell site location applications generally rely on active records to locate cell sites. For example, one can locate an active tower by navigating to an area near enough to the cell site such that it is the point that a mobile device connects to, and the signal strength over the course of several active records can be used to triangulate a location. However, to locate all cell sites in an area by unique identifier, a large number of records may need to be taken at many different points across a geographic region, and even then, it can be difficult to tell if any particular cell site was overlooked. It can be valuable in many situations to know the locations of cell sites in a particular area based upon a small number of observations (i.e. a reduced number relative to the number that would be required to deduce the same information from active records alone). For example, it may be desirable to confirm the locations of cell sites for regulatory purposes and/or military endeavors with minimal activity footprints. Further, there are numerous reasons for why the location of specific cell sites may need to be discovered. Systems and methods described herein can locate cell sites in a geographic region using both active records and passive records, requiring less data, time, and/or equipment than conventional methods. Systems for locating cell sites are described below.

Systems for Locating Cell sites

Figure 1:
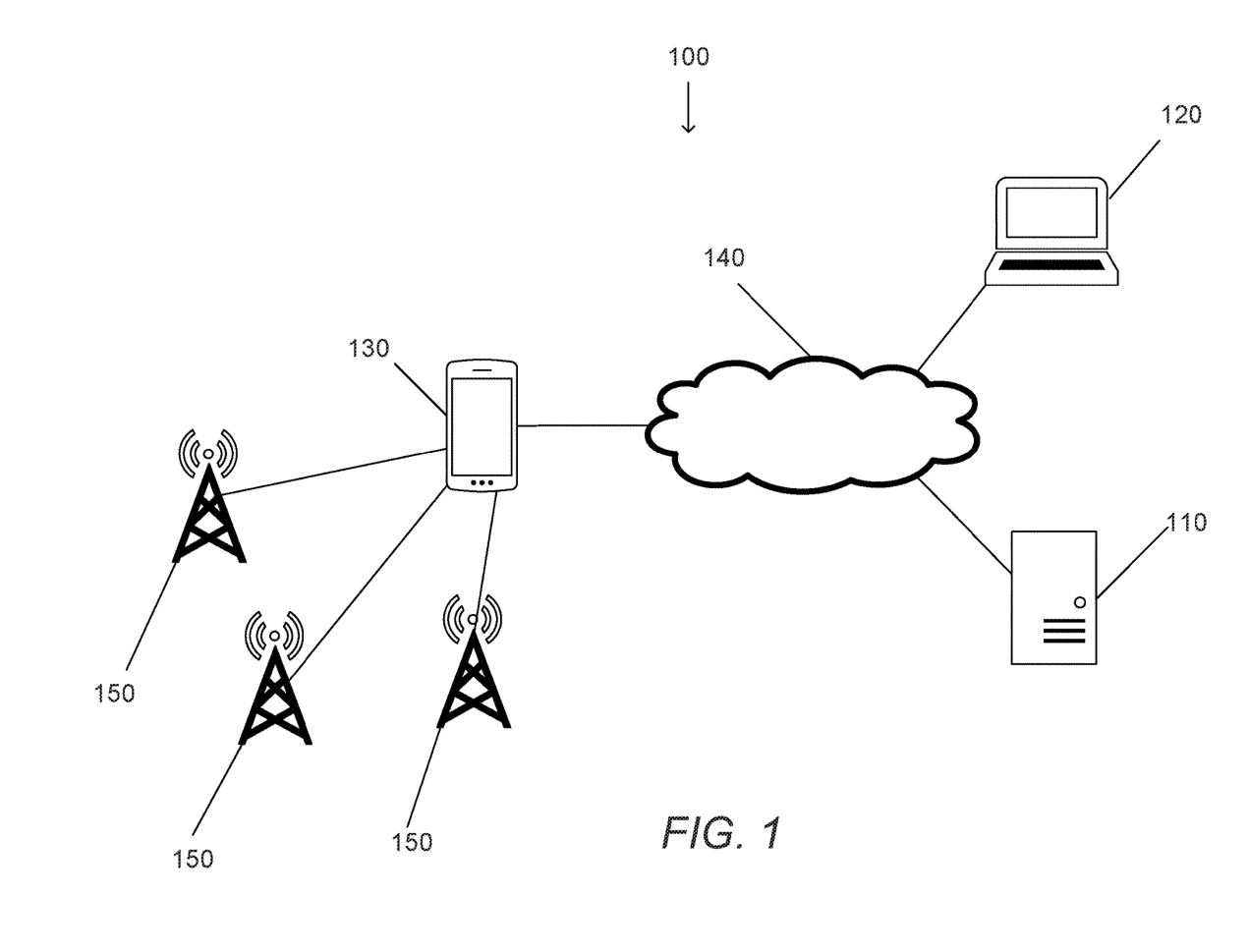
FIG. 1 is a system diagram illustrating a cell site locator system in accordance with an embodiment of the invention.

Systems for locating cell sites can be implemented using a variety of architectures, from single computing devices to distributed computing systems. Systems for locating cell sites can perform cell site locating processes. Turning now to FIG. 1, a system for locating cell sites in accordance with an embodiment of the invention is illustrated.

System for locating cell sites 100 includes a cell site locator device 110. Cell site locator devices can process cell site signal data to locate cell sites. In many embodiments, cell site locator devices are implemented on a personal computer. However cell site locator devices can be implemented using a variety of hardware, including, but not limited to, severs, server clusters (e.g. the Cloud), computer clusters, smartphones, or any other computing device capable of performing cell site locating processes.

System for locating cell sites 100 further includes a display device 120. Display devices can be used to display data obtained by the systems for locating cell sites, displaying the results of cell site locating processes, and/or any other information as appropriate to the requirements of specific applications of embodiments of the invention. In many embodiments, display devices are computer displays. However, display devices can be implemented using a variety of display technologies, including, but not limited to, virtual reality (VR) displays, alternate reality (AR) displays, mixed reality (MR) displays, or any other display technology as appropriate to the requirements of specific applications of embodiments of the invention.

System for locating cell sites 100 further includes at least one recording device 130. In numerous embodiments, recording devices are cell phones. However, recording devices can be any device capable of recording signals transmitted by cell sites. In numerous embodiments, recording devices contain GPS receivers, altimeters, clock circuitries, radio frequency receivers, radio frequency transmitters, radio frequency transceivers, or any other sensor as appropriate to the requirements of specific applications in accordance with various embodiments of the invention. In a number of embodiments, recording devices make observations including active and passive records.

Cell site locator device 110, display device 120, and recording device 130 are connected via a network 140. Network 140 can be any network. Networks can be wired networks, wireless networks, or a hybrid of wireless and wired networks. Network types can include local area networks (LAN), wide area networks (WAN), the Internet, an Intranet, or any other network type as appropriate to the requirements of specific applications of embodiments of the invention.

However, in numerous embodiments, a combination of a cell site locator device, a display device, and/or a recording device are implemented using a single piece of hardware, and circuitry is utilized for at least a portion of communication between components. However, any combination of different components can be utilized in accordance with a given embodiment of the invention. For example, a telecommunication server system and a display device can be implemented on the same piece of hardware, and be in contact via a network with a recording device. While a specific system architecture is illustrated with respect to FIG. 1, any number of different system architectures can be used as appropriate to the requirements of specific applications of embodiments of the invention. Implementations of cell site locator devices is discussed below.

Cell Site Locator Devices

Figure 2:
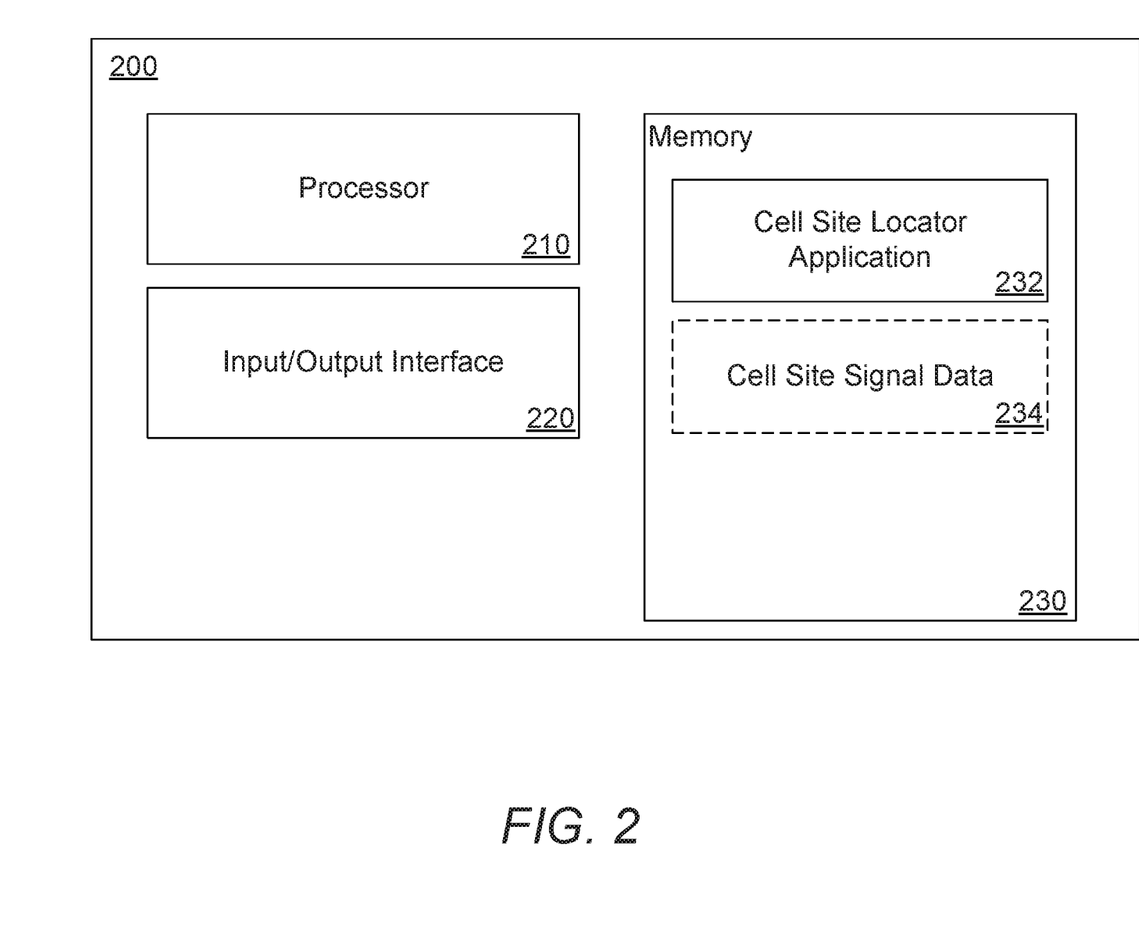
FIG. 2 is a conceptual illustration of a cell site locator device in accordance with an embodiment of the invention.

As noted above, cell site locator devices can perform cell site locating processes, and can be implemented using any number of different computing platforms. Turning now to FIG. 2, a conceptual illustration of a cell site locator device is illustrated.

Cell site locator device 200 includes a processor 210. Processors can be any processing unit capable of performing logic calculations such as, but not limited to, central processing units (CPUs), graphics processing units (GPUs), application-specific integrated circuits (ASICs), field-programmable gate arrays (FPGAs), or any other processing device as appropriate to the requirements of specific applications of embodiments of the invention. Cell site locator device 200 further includes at least one input/output (I/O) interface 220. I/O interfaces can enable communication between the cell site locator device, other components of the system (e.g. mobile devices, display devices, etc.), and/or other devices capable of communicating with the system. In many embodiments, multiple I/O interfaces are used to accommodate different communication methods between components.

Cell site locator device 200 also includes a memory 230. Memory 230 can be any type of memory, such as volatile memory or non-volatile memory. Memory 230 contains a cell site locator application 232. Cell site locator applications can direct processors to perform cell site locating processes. Memory 230 can also contain cell site signal data 234. Cell site signal data is data that describes signals received from cell sites. In numerous embodiments, cell site signal data is obtained from recording devices.

As can readily be appreciated, any number of system architectures can be used to create a cell site locator device. For example, additional components can be added to a cell site locator device to enable the reception of transmitted signals directly. Cell site locating processes capable of being performed by cell site locator devices are discussed below.

Cell Site Locating Processes

Cell site locating processes in accordance with many embodiments of the invention can be used to locate cell sites based on observations made by a recording device. In numerous embodiments, cell site locating processes utilize active and passive records to decrease the total amount of observations required to locate towers. In a variety of embodiments, cell site locating processes can locate towers with increased computational efficiency over conventional methods in manners described below.

Figure 3:
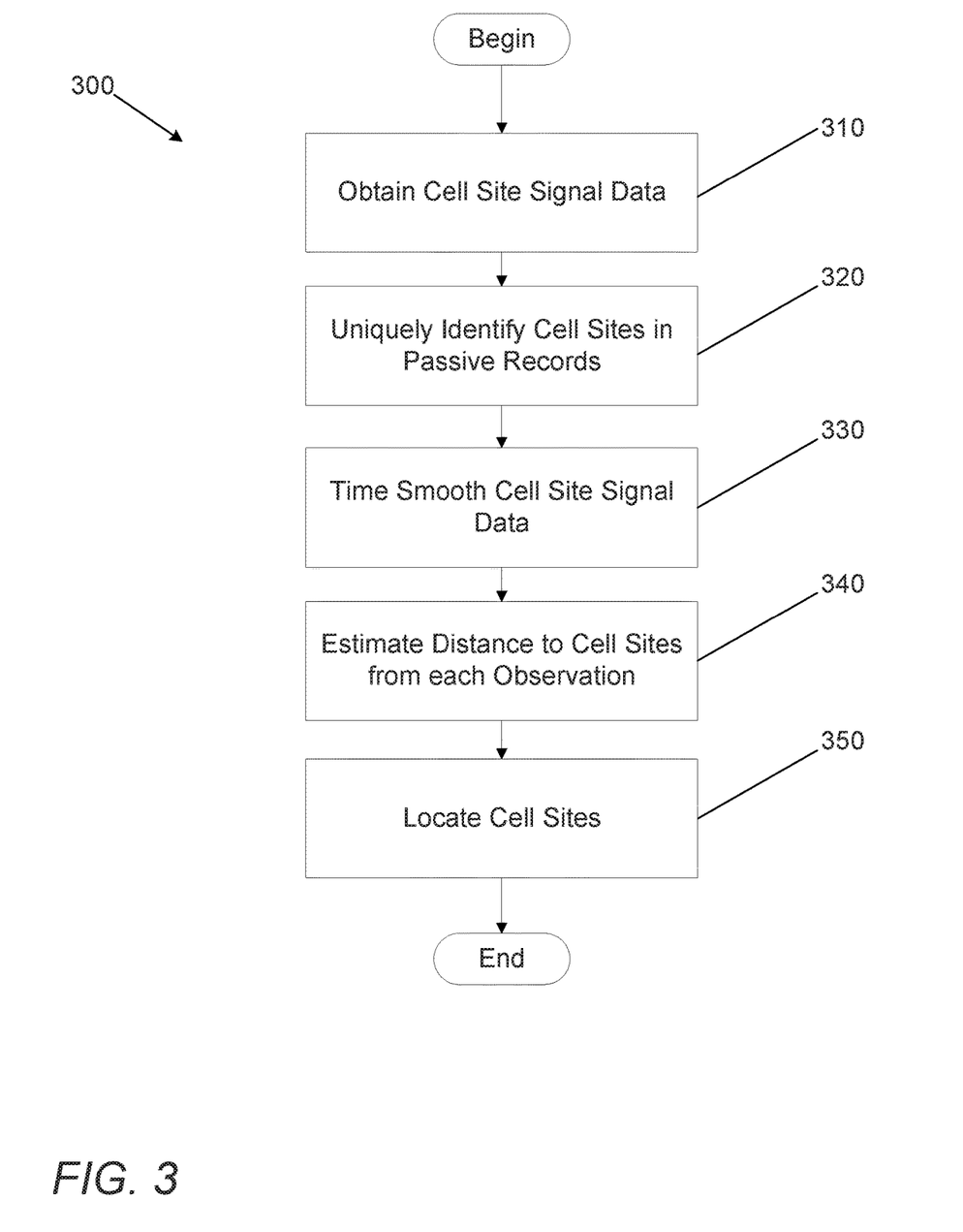
FIG. 3 is a flow chart illustrating a process for locating cell sites in accordance with an embodiment of the invention.

Turning now to FIG. 3, a flow chart for a high-level cell site locating process for locating cell sites in accordance with an embodiment of the invention is illustrated. Process 300 includes obtaining (310) cell site signal data. In many embodiments, cell site signal data describes observations, where each observation includes an active record. In a variety of embodiments, each observation also includes at least one passive record. Cell site signal data can be obtained from recording devices. In numerous embodiments, recording devices are moved throughout a geographic region of interest to make observations. Each cell site can be assigned a unique ID. In many embodiments, the unique ID is broadcast by the cell site. However, unique IDs can be assigned to each cell site when performing cell site locating processes.

Process 300 further includes uniquely identifying (320) cell sites in passive records using cell site signal data. In a variety of embodiments, each active record contains a unique cell site identifier provided by the cell site. For example, a unique cell site identifier may be a Cell ID (CID) if the telecommunications network conforms to the GSM standard. However, any number of different unique identifiers can be used depending on the telecommunications network. In numerous embodiments, passive records do not contain a unique cell site identifier. However, by matching passive records to active records from different observations that describe signals that originate from the same tower, passive records can be annotated to include the unique cell site identifier. Matching passive records to active records can be a complex problem. In numerous embodiments, not every passive record is used due to uncertainty. A more detailed description of various processes for uniquely identifying cell sites that can be utilized in accordance with many embodiments of the invention are described below with respect to FIG. 4. By uniquely identifying cell sites associated with passive records, each passive record can have similar informational value as an active record. Of particular note, the signal strength associated with a passive record can be further associated with a unique cell site identifier.

Process 300 further includes time smoothing (330) cell site signal data. Cell site signal data can include signal strength measurements for each measurement in a record. In numerous embodiments, signal strength is stored as a received signal strength indication (RSSI) metric. However, any number of different signal strength metrics can be used as appropriate to the requirements of specific applications of embodiments of the invention. In many embodiments, when recording devices are being moved throughout a geographic region to make observations, the signal strength at the location of a given observation may fluctuate over time. As such, if a recording device remains at the same location for two or more observations, each observation may contain varying signal strengths associated with the same cell site. Fluctuations in signal strength can be caused by any number of environmental factors such as, but not limited to, fading in the channel, temperature effects, moving objects, etc. For example, if a recording device is located in a vehicle that is moving through a city, but the vehicle is temporarily stopped at a red light, this issue may arise.

As signal strength can be used in cell site locating processes to approximate distance, varying signal strength at a single location can introduce noise. To attempt to reduce noise, the signal strength can be smoothed over time. In many embodiments, the signal strengths are smoothed by taking a moving average of the signal strength over a period of time. In many embodiments, the moving average is only taken over measurements that share identical geographic coordinates. In a variety of embodiments, the moving average is only taken over measurements where the difference between each measurement is less than a smoothing threshold. The window for the moving average can be any size as appropriate to the requirements of specific applications of embodiments of the invention. In some embodiments, a 6 second window is utilized (e.g. 3 seconds in the past, 3 seconds in the future relative to the center point.

Process 300 further includes estimating (340) the distance to cell sites from the locations associated with records. In many embodiments, the signal strengths associated with each cell site are used to predict the location of each cell site. As noted above, signal strength can be affected by numerous factors, including, but not limited to, fading, elevation, obfuscations etc. As such, distance prediction is another complex problem. Predicting distance to cell sites can be achieved using machine learning techniques. For example, in numerous embodiments, a gradient boosted machine is utilized to predict distance. In a variety of embodiments, inputs to the gradient boosting algorithm include time-smoothed signal strength, unsmoothed signal strength and the elevation for each record utilized in the model. Depending on the communication standard utilized by the telecommunication network, various other parameters can be utilized. For example, if the network is a GSM network, the C1 cell selection parameter and the C2 cell reselection parameter can be used as inputs to the gradient boosting model. However, any number of different parameters including, but not limited to, combinations of the above parameters, observations, annotated observations, active records, passive records, and/or additional parameters can be used in machine learning models to predict distance. Furthermore, any number of machine learning models can be utilized to predict distance as appropriate to the requirements of specific applications of embodiments of the invention.

Process 300 further includes locating (350) telecommunications cell sites based on the predicted distances. In many embodiments, heat maps and/or convolutional filters are utilized to find cell site locations. Records can be associated with predicted distances to a given tower. Records can be overlaid onto a map of the geographic region using the associated geographic coordinates, and a ring can be drawn on the map around each observation based on the predicted distance. In numerous embodiments, distance predictions are not 100% accurate, which can result in rings not perfectly meeting at the location of a cell site. To accommodate for inaccuracies in prediction, filters can be applied to each ring. For example, in many embodiments, a Gaussian blur is applied to the rings by applying a convolutional filter. In a variety of embodiments, the mathematical uncertainty from other steps is accounted for by applying convolutional filters. However, any number of different types of blur can be applied as appropriate to the requirements of specific applications of embodiments of the invention. A heat map can be generated using the blurred rings such that the more rings that intersect at a given location, the "hotter" the value assigned to that location. Cell sites can be located by identifying peak "heat" values. Further, the heat map and/or the locations of towers can be provided to a user using a display device. In many embodiments, the heat map and/or the locations of the towers are displayed using techniques similar to those described in U.S. patent application Ser. No. 16/133,631 entitled "Systems and Methods for High Dimensional 3D Data Visualization", the entirety of which is hereby incorporated by reference. Specific processes for uniquely identifying cell sites in passive records are described below.

Uniquely Identifying Cell sites in Passive Records

Cell site locating processes can increase computational and data usage efficiency by increasing the amount of information stored in a passive record by using active records from different observations. This can enable a user to take fewer overall observations, reducing the memory required to store observations. Further, fewer observations can be analyzed to produce similar results as conventional methods.

Figure 4:
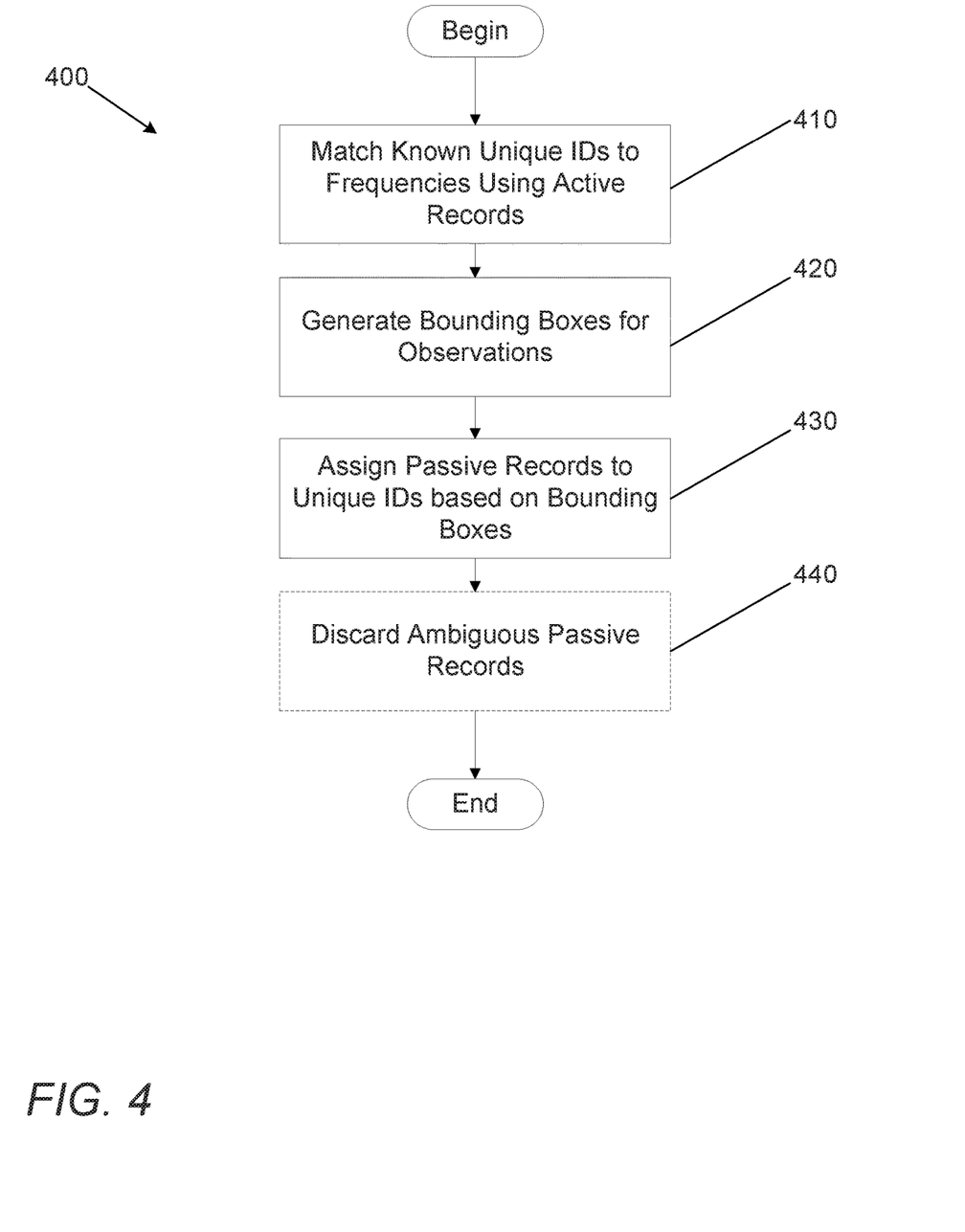
FIG. 4 is a flow chart illustrating a process for uniquely identifying cell sites in accordance with an embodiment of the invention.

Turning now to FIG. 4, a flow chart illustrating a telecommunications cell site locating process for assigning unique cell site identifiers to passive records in accordance with an embodiment of the invention is illustrated. While FIG. 4 is discussed predominantly with respect to terminology from the GSM standard, as can readily be appreciated, the below techniques are broadly applicable to numerous different telecommunication standards. Process 400 includes matching (410) known unique cell site identifiers to frequencies using active records. In many embodiments, each active record contains a unique cell site identifier (a CID for GSM systems) encoded in the received signal, and a signal frequency associated with signal emanating from the transmitting tower. In contrast, passive records do not contain unique cell site identifiers, but do contain a signal frequency metric. In the GSM context, this signal frequency metric can be expressed as the Absolute Radio Frequency Channel Number (ARFCN). However, any frequency metric, such as the signal frequency itself, a bin identifier for a range of frequencies, or any other metric can be used as appropriate to the requirements of specific applications of embodiments of the invention. As such, each unique cell site identifier can be associated with a particular frequency metric using active records.

If it was known that there were no repeating frequency metrics in a geographic area, it can be trivial to associate each passive record with a unique cell site identifier, as the frequency metric for each passive record is known. However, as noted above, due to the density of cell sites in many areas, signal frequencies are often identical or substantially similar between cell sites in a given geographic region. Process 400 further includes generating (420) bounding boxes for each observation. As noted above, each observation can be associated with a geographic coordinate. In numerous embodiments, the bounding boxes for a particular observation are centered on the geographic coordinate. Bounding boxes can be any shape, such as fixed side-length squares, fixed radii circles, or any other shape as appropriate to the requirements of specific applications of embodiments of the invention, including, but not limited to, abstract shapes that take into account geographical features, signal fading models, and/or signal reliability. Each bounding box can be associated with the frequency metric and a unique cell site identifier contained in the active record associated with the observation.

If a passive record with the same frequency metric as a bounding box is within that bounding box, then the unique cell site identifier can be assigned (430) to that passive record. However, in numerous embodiments, if the passive record is within two or more bounding boxes with the same frequency metric as the passive record, then the passive records can be discarded (440) from further analysis and no unique identifier can be assigned. In numerous embodiments, these ambiguous passive records are discarded because they introduce potential noise into the machine learning model utilized to predict distance. In this way, passive records can be made to have additional information and can be utilized similarly to active records. As such, less data can be used to achieve similar results as using conventional methods that utilize a higher quantity of records and/or only active records.

Although specific methods of locating cell sites are discussed above, many different fabrication methods can be implemented in accordance with many different embodiments of the invention. It is therefore to be understood that the present invention may be practiced in ways other than specifically described, without departing from the scope and spirit of the present invention. For example, steps can be performed in alternative orderings as appropriate to the requirements of specific applications of embodiments of the invention. Thus, embodiments of the present invention should be considered in all respects as illustrative and not restrictive. Accordingly, the scope of the invention should be determined not by the embodiments illustrated, but by the appended claims and their equivalents.

What is claimed is:
1. A method for locating cell sites, comprising:
obtaining, from at least one recording device, a plurality of observations, where each observation comprises:
a timestamp indicating the time at which the observation was made;
a coordinate indicating the location at which the observation was made;
an active record describing a signal received from a primary cell site carrying telecommunications data, the active record comprising:
a received signal strength value describing the measured amplitude of the signal received from the primary cell site;
a received signal frequency metric describing the measured frequency of the signal received from the primary cell site; and
a cell ID identifying the primary cell site; and
a set of passive records, where each passive record in the set of passive records describes a signal received from a given secondary cell site, each passive record comprising:
a received signal strength value describing the measured amplitude of the signal received from the given secondary cell site; and
a received signal frequency metric describing the measured frequency of the signal received from the given secondary cell site;
uniquely identifying secondary cell sites in the sets of passive records in the plurality of observations by cross-matching active records in the plurality of observations with passive records from the plurality of observations using a cell site locator device;

annotating the plurality of observations by associating the passive records in the plurality of observations with a cell ID for each secondary cell site based on the unique identifications using the cell site locator device;

time-smoothing received signal strength values in the plurality of observations using the cell site locator device;

estimating a distance from the coordinate from each given observation in the plurality of observations to the primary cell site, and a distance from the coordinate from each given observation to each secondary cell site associated with the given observation by providing a machine learning model with at least the time-smoothed received signal strength values and the plurality of annotated observations using the cell site locator device; and locating primary cell sites in the active records in the plurality of observations based on the estimated distances using the cell site locator device.

2. The method for locating cell sites of claim 1, wherein uniquely identifying secondary cell sites in passive records comprises:

matching, for each given active record in the plurality of observations, the cell ID from the given active record the signal frequency metric from the given active record;

generating geographic bounding boxes for each specific observation in the plurality of observations, where each bounding box is associated with the received signal frequency metric and cell ID for the primary cell site of the active record of the specific observation, and where the bounding box is centered on the coordinate associated with the observation; and assigning a cell ID to each secondary cell site described in each respective passive record in the plurality of observations based on the signal frequency metric of the of each respective passive record, the coordinate of the observation associated with each respective passive record, and the geographic bounding boxes.

3. The method for locating cell sites of claim 2, further comprising discarding ambiguous passive records, where a passive record is determined to be ambiguous if the geographic coordinate of the observation associated with the passive record falls within two or more geographic bounding boxes having the same received signal frequency metric as the passive record.

4. The method for locating cell sites of claim 2, wherein the shape of each geographic bounding box is a square.

5. The method for locating cell sites of claim 2, wherein the shape of each geographic bounding box is based on geographical features near the bounding box.

6. The method for locating cell sites of claim 1, wherein the machine learning model is a gradient boosted machine.

7. The method for locating cell sites of claim 1, wherein each observation further comprises an elevation metric indicating the elevation of the recording device at the time indicated by the timestamp.

8. The method for locating cell sites of claim 7, wherein the machine learning model is further provided with the elevation metric for each observation.

9. The method for locating cell sites of claim 7, wherein primary cell sites and secondary cell sites utilize the GSM standard, and each observation further comprises a C1 cell selection parameter and a C2 cell reselection parameter, and the machine learning model is further provided with the C1 cell selection parameters and C2 cell reselection parameters.

10. The method for locating cell sites of claim 1, wherein locating the primary cell sites further comprises:

for each given cell ID in the plurality of annotated observations:

for each active record and passive record associated with the given cell ID drawing a ring on a map centered at the coordinate for the observation in the plurality of observations containing the active record or passive record with a radius of the predicted distance to the primary or secondary cell site of the active record or passive record, respectively;

applying a convolutional filter to each ring;

generating a heat map based on the rings, such that a higher heat value represents a higher degree of overlap of rings at the given coordinate;

identifying peak heat values as cell site locations; and tagging the identified cell site locations with the given cell ID.

11. The method for locating cell sites of claim 10, wherein the convolutional filter creates a Gaussian blur.

12. The method for locating cell sites of claim 1, further comprising visualizing the locations of each primary cell site and secondary cell site using a display device.

13. The method for locating cell sites of claim 12, wherein the display device is a virtual reality display device.

14. The method for locating cell sites of claim 1, wherein a primary cell site of a first observation is a secondary cell site of a second observation.

15. The method for locating cell sites of claim 1, wherein received signal strength values are expressed as Received Signal Strength Indication metrics (RSSIs).

16. The method for locating cell sites of claim 1, further comprising moving the at least one recording device throughout a geographic region of interest.

17. A system for locating cell sites comprising:

at least one recording device comprising:
a receiver circuitry;
a global positioning system circuitry; and
a clock circuitry;

where the at least one recording device is configured to create observations of cell site signals, where each observation comprises:

a timestamp, obtained with the clock circuitry, indicating the time at which the observation was made;

a coordinate, obtained with the global positioning system circuitry, indicating the location at which the observation was made;

an active record describing a signal received from a primary cell site carrying telecommunications data, the active record comprising:

a received signal strength value describing the measured amplitude of the signal received from the primary cell site;

a received signal frequency metric describing the measured frequency of the signal received from the primary cell site; and a cell ID identifying the primary cell site; and a set of passive records, where each passive record in the set of passive records describes a signal received from a given secondary cell site, each passive record comprising:

a received signal strength value describing the measured amplitude of the signal received from the given secondary cell site; and a received signal frequency metric describing the measured frequency of the signal received from the given secondary cell site;

where the primary cell site signal and secondary cell site signals are received using the receiver circuitry; and a cell site locator device comprising:
  a processor; and
  a memory containing a cell site locator application, where the cell site locator application directs the processor to:
    obtain a plurality of records from the at least one recording device;
    uniquely identify secondary cell sites in the sets of passive records in the plurality of observations by cross-matching active records in the plurality of observations with passive records from the plurality of observations;
    annotate the plurality of observations by associating the passive records in the plurality of observations with unique identifiers for each secondary cell site based on the unique identifications;
    time-smooth received signal strength values in the plurality of observations;
    estimate a distance from the coordinate from each given observation in the plurality of observations to the primary cell site, and a distance from the coordinate from each given observation to each secondary cell site associated with the given observation by providing a machine learning model with at least the time-smoothed received signal strength values and the plurality of annotated observations; and
    locate primary cell sites in the active records in the plurality of observations based on the estimated distances.

18. The system for locating cell sites of claim 17, wherein to uniquely identify secondary cell sites, the cell cite locator application further directs the processor to:
  match, for each given active record in the plurality of observations, the cell ID from the given active record the signal frequency metric from the given active record;
  generate geographic bounding boxes for each specific observation in the plurality of observations, where each bounding box is associated with the received signal frequency metric and cell ID for the primary cell site of the active record of the specific observation, and where the bounding box is centered on the coordinate associated with the observation; and
  assign a cell ID to each secondary cell site described in each respective passive record in the plurality of observations based on the signal frequency metric of the of each respective passive record, the coordinate of the observation associated with each respective passive record, and the geographic bounding boxes.

19. The system for locating cell sites of claim 18, wherein the cell cite locator application further directs the processor to discard ambiguous passive records, where a passive record is determined to be ambiguous if the geographic coordinate of the observation associated with the passive record falls within two or more geographic bounding boxes having the same received signal frequency metric as the passive record.

20. The system for locating cell sites of claim 17, wherein to locate primary cell sites, the cell cite locator application further directs the processor to:
  for each given cell ID in the plurality of annotated observations:
    for each active record and passive record associated with the given cell ID draw a ring on a map centered at the coordinate for the observation in the plurality of observations containing the active record or passive record with a radius of the predicted distance to the primary or secondary cell site of the active record or passive record, respectively;
  apply a convolutional filter to each ring;
  generate a heat map based on the rings, such that a higher heat value represents a higher degree of overlap of rings at the given coordinate;
  identify peak heat values as cell site locations; and
  tag the cell site locations with the associated cell ID.

* * * * *